Patented Oct. 24, 1944

2,360,897

UNITED STATES PATENT OFFICE 2,360,897

SOFTENERS FOR SYNTHETIC RUBBER

Donald V. Sarbach, Cuyahoga Falls, Ohio, assignor to The B. F. Goodrich Company, New York, N. Y., a corporation of New York No Drawing. Application September 12, 1941, Serial No. 410,593

8 Claims. (Cl. 260—36)

This invention relates to a new class of softeners for synthetic rubber and to the improved compositions obtainable by the use of such softeners.

In comparison to natural rubber, synthetic rubber is relatively hard, dry and non-tacky and, unlike natural rubber, is incapable of being masticated to a soft plastic condition in which it may readily be compounded and processed. Accordingly, it is necessary to employ softeners or plasticizers in order to improve its compounding and processing characteristics. The selection of suitable softeners for synthetic rubber has however presented numerous difficulties, particularly in the case of synthetic rubber of the type prepared by the copolymerization of a butadiene-1,3 hydrocarbon and an acrylic nitrile. These difficulties are accentuated by the fact that many softeners ordinarily employed in rubbery or resinous materials are incompatible with this and other types of synthetic rubber and by the further fact that softeners for one type of synthetic rubber do not in all cases function similarly in other types of synthetic rubber. Even varying the proportions of the monomers in the mixtures employed to form copolymers often necessitates the search for new softeners for the synthetic rubber product. Aside from these difficulties some softeners which are compatible with synthetic rubber so adversely affect the properties of vulcanizates prepared from compositions containing them as to preclude their use.

I have now discovered that benzyl alcohol and its alkyl ethers are extremely effective softeners for any of the synthetic rubbers prepared by the polymerization of a butadiene-1,3 hydrocarbon either alone or in admixture with other polymerizable compounds. When such compounds are incorporated in synthetic rubber extremely soft plastic compositions which also possess good tackiness and which may be cured to valuable synthetic rubber vulcanizates are obtained. Accordingly this invention comprises both vulcanized and unvulcanized synthetic rubber compositions containing as a softener, benzyl alcohol or an alkyl ether thereof.

In addition to benzyl alcohol itself such alkyl ethers of benzyl alcohol as benzyl methyl ether, benzyl ethyl ether, benzyl isopropyl ether, benzyl n-propyl ether, benzyl n-butyl ether, benzyl amyl ether, benzyl isoamyl ether, benzyl hexyl ether, benzyl 2-ether hexyl ether and the like may be employed as softeners in this invention. All these compounds possess the general structure

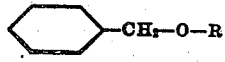—CH$_2$—O—R wherein R is hydrogen or an alkyl group. Compounds in which R is hydrogen or an alkyl group containing less than ten carbon atoms are ordinarily employed in this invention, benzyl alcohol and benzyl amyl ether being particularly effective softeners.

As mentioned hereinabove these softeners may be used with synthetic rubber prepared by the polymerization of a butadiene hydrocarbon, by which is meant butadiene-1,3 and its homologs which polymerize in essentially the same manner such as isoprene, 2-3 dimethyl butadiene-1,3 piperylene and the like, either alone or in admixture with each other or with other unsaturated monomers copolymerizable therewith. Among such unsaturated monomers copolymerizable with a butadiene hydrocarbon to form synthetic rubber there may be mentioned the aryl olefins such as styrene and vinyl naphthalene, the acrylic acids, esters, nitriles and amides such as acrylic acid, methyl acrylate, methyl methacrylate, acrylonitrile, methacrylonitrile, methacrylamide and the like, isobutylene, methyl vinyl ether, methyl vinyl ketone, vinylidene chloride and other unsaturated hydrocarbons, esters, alcohols, acids, ethers, etc., which contain the polymerizable structure $$CH_2=C\diagup_{\diagdown}$$

where at least one of the disconnected valencies is attached to an electro-active group, that is a group which substantially increased the electrical dissymmetry or polar character of the molecule. The polymerization to form a synthetic rubber may be accomplished by any of the well known methods such as polymerization in aqueous emulsion, homogenous polymerization, etc.

The incorporation of the softener with the synthetic rubber may be effected by any desired method as by adding the softener to synthetic rubber while the latter is being worked on a roll mill, masticating a mixture of the rubber and softener in an internal mixer such as a Banbury type mixer, adding the softener to an emulsion or dispersion of the synthetic rubber or by adding the softener to a solution of the rubber in a solvent.

The amount of the softener added will depend somewhat upon the properties desired in the composition and upon the nature of the rubber treated, the rubber and the softener being compatible over a wide range of proportions. In commercial operations it will ordinarily be expedient to employ from about 5 to 50 parts by weight of the softener for each 100 parts of synthetic rubber but amounts smaller or larger than this ranging from 1 to 100 parts of softener for 100 parts synthetic rubber are also effective. With synthetic rubber prepared by the copolymerization of butadiene and styrene or of butadiene and acrylic esters it is possible to use smaller amounts of softener than are required with rubber prepared by the copolymerization of butadiene and an acrylic nitrile.

In a specific example of this invention a softened synthetic rubber composition is prepared by incorporating on a roll mill 50 parts by weight of benzyl alcohol in 100 parts by weight of a synthetic rubber prepared by copolymerizing butadiene and acrylonitrile. The softener adds easily producing an extremely soft gum with excellent tack. The conventional compounding and vulcanizing ingredients including carbon black and sulfur are then dispersed in the softened composition to produce a plastic, tacky, easily processed compound which is then vulcanized to an excellent vulcanizate. The vulcanizate possesses an exceptionally good rebound elasticity and a low permanent set. Moreover the vulcanizate remains substantially unaffected by prolonged immersion in mineral oils.

When only 10 parts of benzyl alcohol are similarly incorporated in 100 parts of a synthetic rubber prepared by the copolymerization of butadiene and styrene, a soft, plastic, easily processed stock is obtained. The stock is much softer and more plastic than a heat softened butadiene styrene copolymer and is even much softer than stocks obtained by the addition of such softeners as pine tar, coal tar or dibutyl phthalate. This softened composition may also be compounded and vulcanized in the usual manner to yield excellent vulcanizates.

In another embodiment of this invention 50 parts by weight of benzyl amyl ether are incorporated in 100 parts by weight of a butadiene acrylonitrile copolymer as described above. This softener also adds quite easily to produce an exceptionally soft plastic composition having increased tack. When such a composition is compounded and vulcanized, excellent vulcanizates are obtained, the vulcanizates possessing especially good rebound elasticity and low permanent set.

Although preferred embodiments of the invention have been herein described it is not intended that the invention be limited solely thereto for many modifications and variations will be apparent to those skilled in the art. For example, other materials such as natural rubber, other softeners, pigments, fillers, vulcanizing agents, accelerators, antioxidants and the like may be included in the compositions herein described without departing from the spirit and scope of the invention as defined in the appended claims.

I claim:

1. A composition of matter comprising a synthetic rubber prepared by the polymerization of a butadiene-1,3 hydrocarbon and, as a softener therefor, a member of the class consisting of benzyl alcohol and alkyl ethers of benzyl alcohol wherein the alkyl group contains less than ten carbon atoms.

2. A composition of matter comprising a synthetic rubber prepared by the copolymerization of a butadiene-1,3 hydrocarbon and at least one other unsaturated compound which contains a

group and is copolymerizable therewith, and, as a softener therefor, a member of the class consisting of benzyl alcohol and alkyl ethers of benzyl alcohol wherein the alkyl group contains less than ten carbon atoms.

3. A composition of matter comprising a synthetic rubber prepared by copolymerizing butadiene-1,3 and acrylonitrile and, as a softener therefor, a member of the class consisting of benzyl alcohol and alkyl ethers of benzyl alcohol wherein the alkyl group contains less than ten carbon atoms.

4. A composition of matter comprising a synthetic rubber prepared by copolymerizing butadiene-1,3 and styrene and, as a softener therefor, a member of the class consisting of benzyl alcohol and alkyl ethers of benzyl alcohol wherein the alkyl group contains less than ten carbon atoms.

5. The composition of claim 3 wherein the softener is benzyl alcohol.

6. The composition of claim 4 wherein the softener is benzyl alcohol.

7. The composition of claim 3 wherein the softener is benzyl amyl ether.

8. A synthetic rubber composition prepared by vulcanizing a copolymer of a butadiene-1,3 hydrocarbon and at least one other unsaturated compound which contains a

group and is copolymerizable therewith in the presence of a compound of the class consisting of benzyl alcohol and alkyl ethers of benzyl alcohol wherein the alkyl group contains less than ten carbon atoms.

DONALD V. SARBACH.

CERTIFICATE OF CORRECTION.

Patent No. 2,360,897.  October 24, 1944.

DONALD V. SARBACH.

It is hereby certified that error appears in the printed specification of the above numbered patent requiring correction as follows: Page 1, first column, line 50, for "2-ether" read --2-ethyl--; and that the said Letters Patent should be read with this correction therein that the same may conform to the record of the case in the Patent Office.

Signed and sealed this 30th day of January, A. D. 1945.

Leslie Frazer (Seal)  Acting Commissioner of Patents.